United States Patent [19]

Wako

[11] Patent Number: 5,343,914

[45] Date of Patent: * Sep. 6, 1994

[54] ALL SEASON PNEUMATIC TIRE

[75] Inventor: Iwamura Wako, Kobe, Japan

[73] Assignee: Sumitomo Rubber Industries Limited, Hyogo, Japan

[ * ] Notice: The portion of the term of this patent subsequent to Nov. 27, 2007 has been disclaimed.

[21] Appl. No.: 881,324

[22] Filed: May 7, 1992

Related U.S. Application Data

[63] Continuation of Ser. No. 588,091, Sep. 25, 1990, abandoned.

[30] Foreign Application Priority Data

Oct. 2, 1989 [JP] Japan ................... 1-258222

[51] Int. Cl.$^5$ ............................. B60C 11/11
[52] U.S. Cl. .............. 152/209 R; 152/DIG. 3
[58] Field of Search ......... 152/209 R, 209 A, 209 D, 152/DIG. 3; D12/146-151, 141

[56] References Cited

U.S. PATENT DOCUMENTS

| | | | |
|---|---|---|---|
| D. 261,494 | 10/1981 | Suzuki et al. | D12/146 |
| D. 274,805 | 7/1984 | Dalmas | D12/146 |
| D. 279,465 | 7/1985 | Nishio et al. | D12/147 |
| D. 283,609 | 4/1986 | Kawabata et al. | D12/147 |
| D. 288,082 | 2/1987 | Nakaseko | D12/147 |
| D. 292,,786 | 11/1987 | Schoonhaven | D12/147 |
| D. 301,024 | 5/1989 | Himuro et al. | D12/147 |
| D. 306,276 | 2/1990 | Graas | D12/147 |
| D. 315,127 | 3/1991 | White et al. | D12/147 |
| D. 317,145 | 5/1991 | Iwamura | D12/146 |
| 3,693,687 | 9/1972 | Hannover et al. | 152/209 R |
| 3,971,424 | 7/1976 | Boileau | 152/209 R |
| 4,055,209 | 10/1977 | Senger | 152/209 R |
| 4,649,975 | 3/1987 | Kogure et al. | 152/209 R |
| 4,765,384 | 8/1988 | Rohde | 152/209 R |
| 4,815,511 | 3/1989 | Brayer et al. | 152/209 R |
| 4,815,512 | 3/1989 | Gerresheim et al. | . |
| 4,856,571 | 8/1989 | Collette et al. | 152/209 R |
| 4,926,919 | 5/1990 | Hopkins et al. | . |
| 4,982,774 | 1/1991 | Evertz | 152/209 R |
| 5,097,882 | 3/1992 | Adam et al. | 152/209 R |

FOREIGN PATENT DOCUMENTS

| | | | |
|---|---|---|---|
| 0075760 | 4/1983 | European Pat. Off. | 152/209 D |
| 0178205 | 8/1986 | Japan | 152/209 R |
| 63-159111 | 2/1988 | Japan | . |
| 0090406 | 4/1988 | Japan | 152/209 R |
| 0275203 | 11/1989 | Japan | 152/209 D |
| 0980590 | 7/1982 | United Kingdom | . |
| 1006180 | 1/1983 | United Kingdom | . |

Primary Examiner—Michael W. Ball
Assistant Examiner—Nancy T. Krawczyk

[57] ABSTRACT

An all season pneumatic tire under the present invention has at the tread section two main grooves which divide the tread width into three tread regions and which are formed substantially, in circumferential direction and in continuation. The distance (GD) between the aforementioned two main grooves, when the maximum width of the tire is TW, is expressed as $0.2TW \leq GD \leq 0.5TW$. Further, the width (GW) of each major groove is expressed as $0.02TW \leq GW \leq 0.07TW$. Further, each of the aforementioned major groove has jogs (JW) shifted treadwidth-wise by an amount the same as or smaller than the groove width (GW), said jog width (JW) being expressed as $0.5 \text{ mm} \leq JW \leq GW$, and is formed substantially, in circumferential direction, and in continuation.

1 Claim, 1 Drawing Sheet

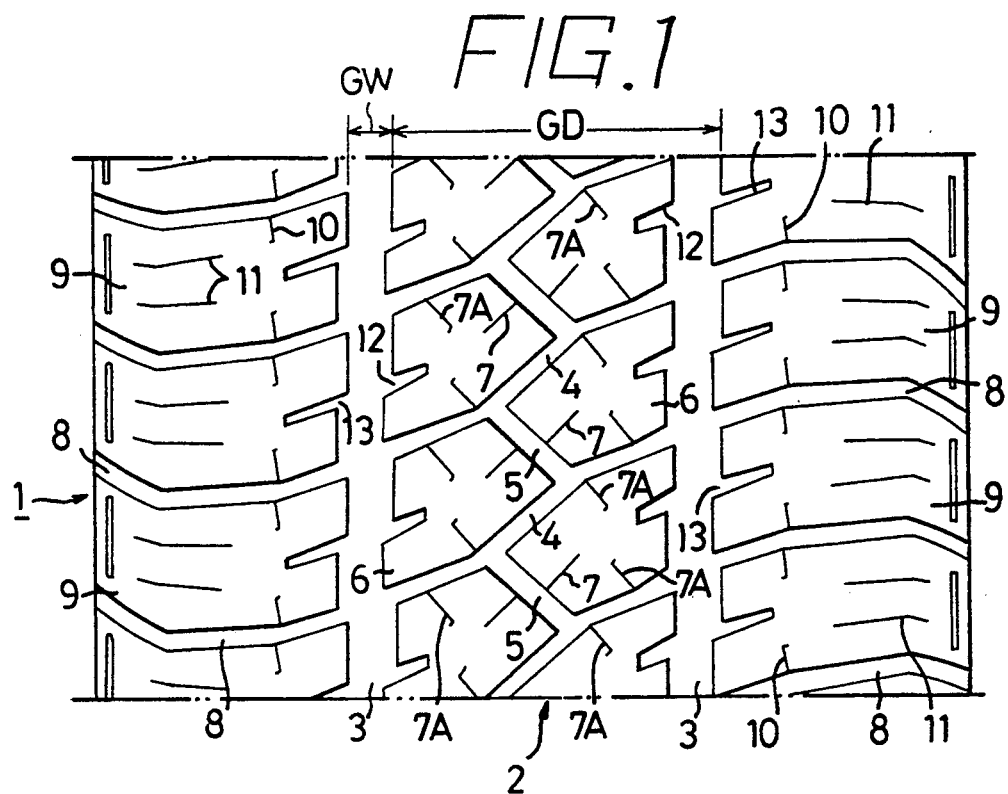
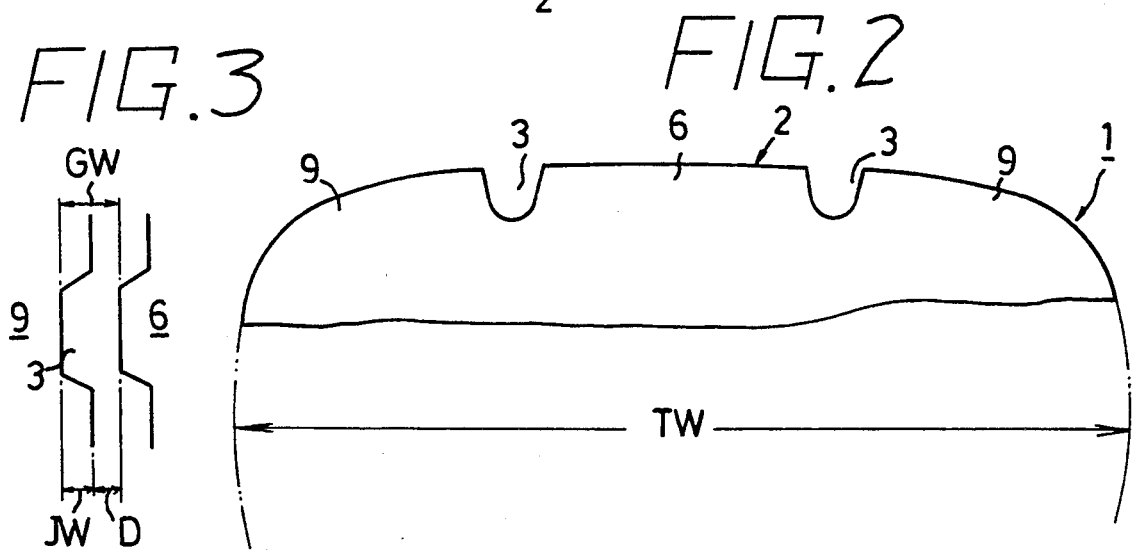

5,343,914

ALL SEASON PNEUMATIC TIRE

This application is a continuation of application Ser. No. 07/588,091, filed on Sep. 25, 1990, now abandoned.

FIELD OF THE INVENTION AND RELATED ART STATEMENT

The present invention relates to an all season pneumatic tire with assured snow performance and with improved noise performance and driving stability performance, or more specifically an improvement of the tread section of said tire.

A conventional all season pneumatic tire has a tread section having four main grooves with intervals positioned tread-width-wise and formed in circumferential direction, wherein block patterns are provided between said main grooves.

However, said conventional all season pneumatic tire, while satisfying requirements for snow performance, had problems with the pattern noise, dry driving stability on a dry road (feeling and cornering power) and wet driving stability on a wet road.

Also, while the so-called summer tire, having three main grooves on the tread section formed in circumferential direction and with intervals tread-width-wise, satisfied the requirements for pattern noises and dry and wet driving stabilities, the tire had a problem in snow performance.

OBJECTS AND SUMMARY OF THE INVENTION

The present invention aims at offering an all season pneumatic tire which upon improvement of the tread section will give satisfactory levels of pattern noises and dry and wet driving stabilities while also providing satisfactory snow performance.

To achieve the above objective, the present invention adopts the following technical means.

That is, the present invention is characteristic in that a tread section 2 has two main grooves 3 formed substantially, in circumferential direction, and in continuation so as to divide the tread width into three tread regions; that the distance GD between the aforementioned two main grooves 3 when the maximum tire width is TW, is expressed as:

$$0.2TW \leq GD \leq 0.5TW,$$

and the width GW of each main groove 3 is expressed as:

$$0.02TW \leq GW \leq 0.07TW;$$

further that each of the aforementioned main grooves 3 has jogs JW shifted tread-width-wise in the amount same as or smaller than the groove width GW, said jogs JW being expressed as $0.5 \text{ mm} \leq JW \leq GW$, and is formed substantially, in circumferential direction, and in continuation.

BRIEF DESCRIPTION OF THE DRAWINGS

The drawings illustrate an embodiment of the present invention,

FIG. 1 being a top view illustrating the tread pattern,

FIG. 2 a front view, and

FIG. 3 a main front view.

DESCRIPTION OF THE PREFERRED EMBODIMENTS

A preferred embodiment of the present invention and its functions are described below in reference to the drawings.

FIG. 1 indicates a tread section 2 of an all season pneumatic tire of the present invention, said tread section 2 having two main grooves 3 positioned to divide the tread width into three tread regions and formed substantially, in circumferential direction, and in continuation.

The following explanation provides the reasons why the two main grooves 3 are placed in such positions so as to divide the tread width into three tread regions.

When only one main groove is centrally located tread-width-wise, the anti-hydroplaning feature will be aggravated due to insufficient groove volume.

In addition, when more than three main grooves are provided with intervals between them tread-width-wise, the noise performance will be aggravated due to excessive groove volume.

Of course, this occurs when the main groove takes the following width.

The distance GD between main grooves 3 in FIG. 1 is to have the following relationship with the maximum tire width TW in FIG. 2:

$$0.2TW \leq GD \leq 0.5TW,$$

This is mainly due to the fact that, when the main groove 3 is outside the range mentioned above, the stable driving performance is aggravated on a dry road.

In other words, when $0.2TW \geq GD$, the rigidity of the tread crown section is overly impaired and, when $GD \geq 0.5TW$, the rigidity at the shoulder section is grossly deteriorated, both causing an undesirable effect in the stable driving performance of the tire.

Further, the width GW of the main groove 3 in FIG. 1 is to have the following relationship with the maximum tire width TW in FIG. 2:

$$0.02TW \leq GW \leq 0.07TW,$$

This is because, when $0.02TW > GW$, it will aggravate the snow and wet performances due to an excessively small groove volume.

On the other hand, when $0.07 < GW$, the noise performance will be impaired due to an excessively large groove volume.

Further, each of the aforementioned main grooves 3, as shown in FIG. 3, has jogs JW shifted tread-width-wise by a width narrower than the groove width GW, said jog width JW being $0.5 \text{ mm} \leq JW \leq GW$ and the main groove 3 not being circumferentially linear but in a U-shape as in FIG. 3 or in a waveform shown outside the Figure circumferentially.

When the relationship between the amount of shifting at jogs JW and the groove width GW is made $JW \leq GW$, it would increase the pneumatic pressure in the groove at the time of contact with the ground, which increases the sound pressure level of so-called air pumping and acts adversely on the noise performance; also the elimination of straight, circumferential grooves works rather adversely to the anti-hydroplaning performance; therefore, $JW \leq GW$ has been adopted.

Further, 0.5 mm≤JW≤GW was adopted, because JW below 0.5 mm means that smaller protrusions tire-width-wise would worsen the snow performance and also because JW>GW means that no straight groove in the circumferential direction would work adversely to anti-hydroplaning and noise performances as mentioned above. D in FIG. 3 indicates the amount of meandering in the direction of tread width.

Further, as indicated in FIG. 1, at the central tread area between the aforementioned main grooves 3 is formed a block pattern of a center block 6, wherein the two main grooves 3 on right and left are connected with each other by inclined grooves 4 and said inclined grooves 4 are connected with each other by means of interconnection grooves 5; and in said center block 6 are formed sipes 7, 7A at each inclined groove 4 and interconnection groove 5 almost perpendicularly to their length.

Also, at both side areas outside the aforementioned main grooves 3 are tread-width-wise lateral grooves 8 extending tread-width-wise with intervals between each other in the circumferential direction, forming the block pattern of side blocks 9; and on each of said side blocks 9 are formed sipes 10 extending in the circumferential direction and sipes 11 extending in the tread width direction.

Further, on elevated walls of the main grooves 3 are formed inclined slits 12, 13 positioned almost at the center of individual blocks 6, 9 and with intervals in the circumferential direction.

Next, shown in the table below are the indexed test results of Tire A, an embodiment of the present invention; Tire B, a conventional all season tire possessing four main grooves; and Tire C, a conventional, so-called summer tire possessing three main grooves.

The pattern noise was measured under JIS conditions by rotating the tire on a drum in an anechoic laboratory; and the snow performance, dry driving stability and wet driving stability were tested using a Japanese automobile with a displacement of 2,000 cc, having each tire mounted onto it, and having it run on a snow road, dry asphalt road and wet asphalt road; and their evaluations and measurements are shown below.

What is claimed is:
1. An all season pneumatic tire comprising a tread section including only two main grooves (3) dividing the tread width into three tread regions formed substantially in a circumferential direction and in a continuous arrangement, each of said two main grooves (3) having a groove width (GW) and a center block (6) therebetween, and a distance (GD) includes one of the two main grooves (3) and a tread section between the two main grooves (3), when the maximum tire width is (TW), is expressed as:

$$0.2TW \leq GD \leq 0.5TW,$$

and the width (GW) of each said main groove (3) is expressed as:

$$0.02TW \leq GW \leq 0.07TW;$$

each of said main grooves (3) being provided with two opposed side walls, the side walls being substantially parallel to the circumferential direction of the tire with jogs (JW) shifted thread-width-wise by a distance the same as or smaller than the groove width (GW), said jog width (JW) being expressed as:

$$0.5 \, mm \leq JW \leq GW,$$

and being formed substantially, in a circumferential direction and in a continuous arrangement, between the two main grooves (3), inclined grooves (4) are provided which are extended tread-width-wise to connect the two main grooves (3) and with interconnecting grooves (5) extended in circumferential direction to connect said inclined grooves, side blocks being formed tread-width-wise at both side areas outside the main grooves (3), said side blocks (9) comprising sideways grooves (8) extending in the tread-width-wise direction and spaced a predetermined distance from one another in the circumferential direction, sips (7A) extending generally perpendicularly from the inclined grooves (4) and sipes (7) extending generally perpendicularly from the interconnecting grooves (5) and said side blocks (9) possess sipes (11) extended tread-width-wise and sipes (10) extended

|                    |             | Tire |                                    |     |                                   |     |                              |
|--------------------|-------------|------|------------------------------------|-----|-----------------------------------|-----|------------------------------|
| Inspection Items   |             | Tire A |                                  | Tire B |                                 | Tire C |                            |
| Pattern Noise      | Feeling     | 100  | fair                               | 90  | rather large reflected, pitching sound | 100 | fair                         |
|                    | Measurement | 100  |                                    | 95  |                                   | 100 |                              |
| Snow Performance   | Feeling     | 100  | same as conventional all season tire | 100 |                                   | 80  | quite inferior               |
|                    | Measurement | 100  |                                    | 100 |                                   | 85  |                              |
| Dry Driving Stability | Feeling  | 95   | good response                      | 85  | low ceiling, poor response        | 100 | high ceiling, good response  |
|                    | CP          | 100  |                                    | 90  |                                   | 100 |                              |
| Wet Driving Stability | Feeling  | 100  | good                               | 90  | slightly inferior                 | 100 | fair                         |

The present invention is as indicated above and provides an all season pneumatic tire, wherein the tread pattern under the present invention assures snow performance and improves the noise performance as well as the driving stabilities both on dry and wet roads, which is quite meaningful.

in the circumferential direction, inclined slits (12), (13) being formed on elevated walls of the main groove (3) which extend tread-width-wise and are positioned approximately at the center of clocks (6), (9) with intervals disposed in the circumferential direction.

* * * * *

UNITED STATES PATENT AND TRADEMARK OFFICE
CERTIFICATE OF CORRECTION

PATENT NO. : 5,343,914
DATED : September 6, 1994
INVENTOR(S) : Wako IWAMURA

It is certified that error appears in the above-indentified patent and that said Letters Patent is hereby corrected as shown below:

On title page, item [75] .

change the inventor's name from "Iwamura WAKO" to --Wako IWAMURA--.

Signed and Sealed this

Twentieth Day of December, 1994

Attest:

BRUCE LEHMAN

*Attesting Officer*    *Commissioner of Patents and Trademarks*